United States Patent [19]

Park

[11] Patent Number: 5,599,871
[45] Date of Patent: Feb. 4, 1997

[54] THERMOPLASTIC RESIN COMPOSITION HAVING GOOD PAINTING AND SURFACE-POLISHING PROPERTIES

[75] Inventor: Bong-Hyun Park, Kyungsangnam-do, Rep. of Korea

[73] Assignee: Hyundai Motor Company, Seoul, Rep. of Korea

[21] Appl. No.: 366,297

[22] Filed: Dec. 29, 1994

[30] Foreign Application Priority Data

Dec. 30, 1993 [KR] Rep. of Korea .................. 93-31614

[51] Int. Cl.$^6$ ................................. C08L 77/00
[52] U.S. Cl. ...................... 524/504; 524/186; 524/210; 524/230; 524/232; 524/514
[58] Field of Search .............. 525/179, 66; 524/186, 524/514, 504, 210, 230, 232

[56] References Cited

U.S. PATENT DOCUMENTS

| | | | |
|---|---|---|---|
| 4,732,938 | 3/1988 | Grant et al. | 525/92 |
| 4,778,848 | 10/1988 | Trabert et al. | 525/66 |
| 4,798,865 | 1/1989 | Grant et al. | 525/92 |
| 4,923,924 | 5/1990 | Grant et al. | 525/66 |
| 4,966,941 | 10/1990 | Subramanian | 525/66 |
| 5,242,960 | 9/1993 | Ostlinning et al. | 524/126 |

*Primary Examiner*—Ana Woodward
*Attorney, Agent, or Firm*—Finnegan, Henderson, Farabow, Garrett & Dunner, L.L.P.

[57] ABSTRACT

This invention relates to a thermoplastic resin composition having good painting and surface-polishing properties and more particularly, to a thermoplastic resin composition that includes a polyamide, a polyamide copolymer, a thermoplastic elastomer and a fluoride polymer.

7 Claims, No Drawings

THERMOPLASTIC RESIN COMPOSITION HAVING GOOD PAINTING AND SURFACE-POLISHING PROPERTIES

FIELD OF THE INVENTION

The present invention relates to a thermoplastic resin composition having good painting and surface-polishing properties, including a thermoplastic resin composition comprising a polyamide, a polyamide copolymer, a thermoplastic elastomer and a fluoride polymer.

BACKGROUND OF THE INVENTION

Presently, a variety of coating materials are used for painting exterior parts of materials such as construction materials, daily commodities, etc., including automotive parts. In such uses, it is necessary that the coating material compositions exhibit the following properties: a) impact resistance for an outer environment, b) heat resistance for high temperature painting processes, c) improved surface polishing property for better appearance, and d) improved dispensability to maintain uniform rigidity.

Among these coating materials, the polyamide resins polyamide-6 and polyamide-66 are being widely employed as coating material compositions since they possess not only good mechanical properties such as strength, rigidity, toughness, abrasion resistance, etc., but also favorable heat resistance, grease and oil-proof, chemical tolerance and molding properties.

Disadvantages of these materials, however, are shown in the following:

1) British Patent Nos. 387903 and 327978 and German Patent No. 3827668; even though the crystallized polyamide and polyolefin resin composition, supplementing an inorganic filling agent, proves to have good heat resistance, rigidity and stabilized measurement, their light mass design may not be fully materialized due to their insufficient surface polishing and molding properties and high specific gravity.

2) U.S. Pat. No. 4,923,924, British Patent No. 2951035 and German Patent No. 3834912; even though the modified polyphenylene oxide or modified polyphenylene ether resin composition has relatively good properties in terms of impact resistance and heat resistance, their inferior properties such as fluidity, photo-resistance and chemical tolerance make them less suitable for exterior materials and so of limited utility.

3) With respect to amorphous polyamides, the amorphous polyamide (U.S. Pat. No. 2,696,482) consisting of a polycondensate of bis(4-aminocyctohexyl)methane and isophthalic acid and the amorphous polyamide (U.S. Pat. No. 3,597,400) of a polycondensate consisting of bis(4-aminocyclohexyl)methane, hexamethylene diamine, isophthalic acid and terephthalic acid both exhibit poor fluidity due to their high melting points; injected molding is therefore very difficult. Also, since the amorphous polyamide and thermoplastic elastomer alloys have poor fluidity, molding is not easy. Accordingly, the present inventors have sought to overcome these defects of the prior art and so have proposed: after adding polyamide copolymer to polyamide, the mixture is blended with a thermoplastic elastomer having good impact modification at low temperature together with a fluoride polymer for better surface polishing and painting, a thermoplastic resin composition having good painting and surface polishing properties is obtained.

SUMMARY OF THE INVENTION

The object of this invention is to provide a thermoplastic resin composition having good physical properties. Additional features and advantages of the invention will be set forth in the description which follows, and in part will be apparent from the description or may be learned from practice of the invention. The advantages of the invention will be realized and attained by the composition particularly pointed out in the written description and claims.

To achieve these and other advantages and in accordance with the purpose of the invention, as embodied and broadly described, the invention provides a thermoplastic resin composition comprising 55–90 wt % of a polyamide, 5–30 wt % of a polyamide copolymer, 3–30 wt % of a thermoplastic elastomer, 1–5 wt % of a fluoride polymer and 0.2–2.5 wt % of an amide modified wax.

It is to be understood that both the foregoing general description and the following detailed description are exemplary and explanatory and are intended to provide further explanation of the invention as claimed.

DETAILED DESCRIPTION OF THE INVENTION

This invention relates to a new thermoplastic resin composition, having superior painting and surface polishing properties, which comprises a polyamide and a polyamide copolymer blended in a certain ratio having added thereto a thermoplastic elastomer and a fluoride polymer, so as to improve a variety of physical properties such as painting and surface polishing.

The polyamide in the present invention is preferably used in 55–90 wt % in proportion to the total composition. When the content of polyamide is less than 55 wt. %, the increased fluidity makes molding poor; when the content exceeds 90 wt. %, resistance to impact is reduced.

The polyamide used in this invention may be prepared by condensation polymerization of hexamethylene diamine and adipic acid.

However, in order to enhance flexibility, toughness and molding, a polyamide copolymer having up to 20 wt. % may be preferably used.

Illustrative polyamides include polyamide-6 and polyamide-66 from a polycondensate consisting of hexamethylene diamine and an equimolar amount of adipic acid; illustrative polyamide copolymers include a) polyamide-66 copolymers exceeding 80 wt. % in their contents, e.g., polyamide-66/6 polyamide-66/610, polyamide-66/612, polyamide-66/612, polyamide-66/11, polyamide-66/12, polyamide-66/6/610, polyamide-66/6/612, etc., and b) polyamide mixtures, such as polyamide-66/polyamide-6, polyamide-66/polyamide-610, polyamide-66/polyamide-612, polyamide-66/polyamide-11, polyamide-66/polyamide-12, polyamide-66/polyamide-69, polyamide-66/polyamide-66/6, polyamide-66/polyamide-66/612, etc. Generally, polyamide-66 copolymers having a polyamide content of less than 80 wt. % are not preferred due to possible reduction in heat resistance and mechanical physical properties.

The diamines used for manufacturing the polyamide in the present invention are preferably aliphatic diamines having 6 through 15 carbons and diamines having the formula(I); dicarboxylic acids selected from aliphatic dicarboxylic acids having 6 through 15 carbons, isophthalic acid, terephthalic acid and lactam or amino acid having 6 through 15 carbons and manufactured through condensation polymerization.

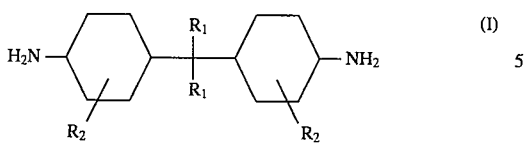

wherein:

$R_1$ and $R_2$ are same or different and each is hydrogen or an alkyl group having 1 to 3 carbons.

The polyamide copolymer in the present composition is preferably employed in less than 30 wt. % due to high melting point. Where the content of polyamide copolymer exceed 30 wt. %, drastic reduction in fluidity makes molding poor and the resultant elevation of material cost is noneconomical. However, when the content of polyamide copolymer is less than 5 wt. %, the objectives of the present invention may not be achieved.

Illustrative aliphatic diamines of formula(I) are:

bis(4- aminocyclohexyl) methane, bis(4-ammno-2-methylcyclohexyl)methane, bis(4-amino-3-methylcyclohexyl)methane, bis(4-amino-2-ethylcyclohexyl)methane, bis(4-amino- 3-ethylcyclohexyl)methane, bis(4-amino-2-propylcyclohexy)methane, bis(4-amino-3-propylcyclohexyl)methane, bis(4-amino-2-isopropylcyclohexyl)methane, bis(4-amino-3-isopropylcyclohexyl)methane, bis(4-aminocyclohexyl)propane, bis(4-amino-2-methylcyclohexyl)propane, bis(4-amino-3-methylcyclohexyl)propane, bis(4-amino-2-ethylcyclohexyl)propane, bis(4-amino-3-ethylcyclohexyl)propane, bis(4-amino-2-propylcyclohexyl)propane, bis(4-amino-3-propylcyclohexyl)propane, bis(4-amino-2-isopropylcyclohexyl)propane, bis(4-amino-3-isopropylcyclohexyl)propane.

Generally, the aliphatic diamine is composed of an amino group at the 1-and 4-positions of the cyclohexane ring; such compounds exhibit geometrical isomers when produced by the addition of hydrogen, i.e., mixtures of trans-trans (t-t) structure, cis-trans (c-t) structure, and cis-cis (c-c) structure. Usually, when the content of t-t structure increases, the free transfer temperature of the polymer (hereinafter called "Tg") becomes high and heat resistance is enhanced. Conversely, when the content of c-c structure increases, Tg and heat resistance tend to be reduced. In this context, it is particularly preferable for the isomer content to be controlled in accordance with the intended use requirements.

The aliphatic diamines may be employed alone or as mixtures. Preferably, the aliphatic diamine is used in a specific ratio with one of the following aliphatic diamine monomers which have 6 to 15 carbons: hexamethylenediamine, 2,2,4-trimethylhexamethylene diamine, 2,4,4-trimethylhexamethylene diamine, heptamethylene diamine, octamethylene diamine, nonamethylene diamine, decamethylene diamine, undecamethylene diamine, dodecamethylene diamine, etc.

Further, with respect to varying particular characteristics, such as Tg, fluidity, transparency or modulation of chemical tolerance, etc., for a particular use, the aliphatic diamine may be also mixed with a minor amount of an aliphatic and aromatic diamine monomer such as 3-aminomethyl-3,5,5-trimethylcyclohexamine, 2,5-bis(aminomethyl)norbornane, 2,6-bis(aminomethyl)norbornane, isophorone diamine, 1,4-diaminomethyl cyclohexane, m-xylene diamine, p-xylene diamine, etc.

In addition, the dicarboxylic acid monomers, which are preferably used in equimolar amounts with respect to the diamine monomer, are represented by a) aliphaticdicarboxylic acids having 6 to 15 carbons, such as adipic acid, azelaic acid, suberic acid, sebacic acid, decanoic acid, undecanoic acid, dodecanoic acid, 2,2,4-trimethyladipic acid, 2,4,4-trimethyladipic acid, etc., b) aromatic dicarboxylic acid represented by isophthalic acid or terephthalic acid, and c) lactam or amino acid having 6 to 15 carbons, such as ε-caprolactam and ω-laurolactam.

Among these compounds, adipic acid is a particularly preferred dicarboxylic acid monomer. With respect to varying particular characteristics, such as Tg, fluidity, transparency or modulation of chemical tolerance, etc., for a particular use, a minor amount of aliphatic dicarboxylic acid such as cyclohexane-1,3-dicarboxylic acid or cyclohexane-1,4-dicarboxylic acid may be preferably used.

Accordingly, the dicarboxylic acid monomers preferably contains more than 5 mole from one of the following components: isophthalic acid, terephthalic acid or an aliphatic diamine of formula (I). When the content of aliphatic diamine of formula (I), isophthalic acid or terephthalic acid is less than 5 mole, superior heat resistance is not be obtained.

In addition to the diamine monomer or dicarboxylic acid monomer, the polyamide copolymer may be mixed with a lactam monomer or amino acid polymer such as ε-caprolactam, ω-laurolactam, 6-aminocapronic acid, 11-aminoundecanoic acid or 12-amino dodecanoic acid, etc.

Moreover, in order to give improved impact resistance to physical collisions at low temperature of −30°–40° C. or impacts such as from gravel, the inventive composition further contains 3–30 wt. % of a polycondensate selected from the following components: α,β-unsaturated acid anhydride or a derivative thereof grafted to an ethylene thermoplastic elastomer, such as ethylene and olefins having 3 to 8 carbons, or acrylic acid or a derivative thereof, a vinyl monomer or a diene monomer having less than 10 mole % as a common low ratio.

When the content of thermoplastic elastomer is less than 3 wt. %, low-temperature impact resistance is reduced; when greater than 30 wt. %, a sharp reduction in heat resistance and fluidity results, which may unfavorably affect molding, especially injection molding.

Illustrative olefins having 3 to 8 carbons include propylene, butylene, butadiene, 1-pentene, isobutylene, 4-methyl-1-pentene, isoprene, 1-hexene, 1,3-hexadiene, 1,4-hexadiene or 1-heptene; acryl acids and derivatives thereof, including methylacrylate, ethylacrylate, butylacrylate, octylacrylate, 2-ethylhexylacrylate, glycidylacrylate, methylmethacrylate, ethylmethacrylate, 2-ethylhexylmethacrylate, hydroxyethylmethacrylate, aminoethylmethacrylate, glycidyl methacrylate and acrylic acid, methacrylic acid and acrylic acid, and metallic salts of methacrylic acid.

Illustrative vinyl monomers include styrene, α-methylene styrene, acrylonitrile or vinyl chloride and illustrative diene monomers include 1,3-cyclohexadiene, 1,4-cyclohexadiene, butadiene, cyclopentadiene, 1,3-pentadiene 2,4-hexadiene, 2,5-norbornadiene, 2-ethyl-2,5-norbornadiene and 2-(1'-prophenyl)-2-norbornene, etc.

Suitable thermoplastic elastic bodies also include ethylene/propylene copolymers, ethylene/propylene/diene copolymers, styrene/ethylene/butylene/styrene copolymers and ethylene/ethylacrylate copolymers, etc. Among these, a graft of an α,β-unsaturated acid anhydride on a copolymerization monomer of a cocondensate consisting of ethylene, propylene and diene monomer is the most preferred.

Representative α,β-unsaturated acid anhydrides or α,β-unsaturated acids and their derivatives grafted to the thermoplastic elastomer include anhydrous maleic acid, anhydrous iraconic acid, anhydrous citraconic acid, acrylic acid, methacrylic acid, maleic acid, methylmaleic acid, fumaric acid, ethylfumaric acid, dimethylmaleic acid or diethylmaleic acid, etc.

The 1–5 wt % of fluoride polymers used in the present invention to improve the surface polishing and painting properties preferably include: a) 40–100 wt % of a fluoride compound selected from the compounds of formula (II) and an olefin having 2 to 8 carbons, such as ethylene, propylene, butylene, butadiene, 1-pentane, isobutylene, 4-methyl-1-pentane, isoprene, 1-hexene, 1,3-hexadiene, 1,4-hexadiene, and b) 60–0 wt % of a polycondensate of a melting fluoride polymer and an olefin.

Since the heat resistance of fluoride polymers is generally very excellent, the fluoride polymers may contribute to the enhancement of the heat resistance of the inventive composition. Accordingly, when the content of fluoride polymer is less than 1 wt. %, improved heat resistance may not be achieved; when the content exceeds 5 wt. %, the cost is very high and uneconomical and poor fluidity may badly affect processing.

wherein,
$R_1$, $R_2$ and $R_3$ are H or F, $R_4$ is F, Cl, $CF_3$ or $CF_2CF_3$, at least one of $R_1$, $R_2$ $R_3$ and $R_4$ being a fluoric group.

Illustrative fluoride polymers include the following:

a) polytetrafluoroethylene (PTFE) and material (FEP) copolymerized from tetrafluoroethylene (TFE) and hexafluoropropylene(HFP); b) polychlorotrifluoroethylene (PCTFE), polyfluorovinylidene (PVDF) and material (ETFE) copolymerized from tetrafluoroethylene(TFE) and ethylene; c) material (ECTFE) copolymerized from chlorotrifluoroethylene (CTFE) and ethylene; d) material (VDF/HFP) copolymerized from vinylidene fluoride (VDF) and hexafluoropropylene; e) material (VDF/PFP) copolymerized from VDF and pentafluoropropylene (PFP); f) material (VDF/HFP/PFP) copolymerized from VDF, HFP and PFP; g) material (VDF/HFP/TFE copolymerized from VDF, HFP and TFE; h) material (VDF/PFP/TFE copolymerized from VDF, PFP and TFE; and i) material (VDF/CTEF) copolymerized from VDF and CTFE or from TFE and propylene.

In order to supplement a variety of properties in the inventive resin composition, the following materials may also be added: amide modified wax, processed stabilizer, thermal stabilizer, photo-stabilizer, aging stabilizer (e.g., aromatic amine stabilizer, nickel stabilizer, hindered tenoric stabilizer, phosphoric stabilizer or sulfuric stabilizer, etc.) and plastic additives (e.g., pigment, dye, crystalline agent, inorganic filling agent, surfactant, dispersant, lubricant, mold releaser, plasticizer or polisher, etc.).

According to the present invention, 0.2–2.5 wt % of an amide modified wax is preferably added. When the content is less than 0.2 wt. %, the surface polishing property is reduced; when greater than 2.5 wt. %, impact resistance is reduced.

The thermoplastic resin composition of this invention has particular advantages in that it has good heat and impact resistance in equilibrium. Moreover, due to its excellent properties such as painting, dispersing, processing, molding and surface polishing, the inventive thermoplastic resin composition may be most effectively and widely used in exterior plastic parts.

Hereafter, the present invention is described in more detail based upon the following examples, but the invention is not confined to the examples.

Polyamide, polyamide copolymer and thermoplastic elastomer used in the EXAMPLES and COMPARISONS are as follows:

(1) Polyamide
a) Polyamide I (C-PA I): Polyamide comprising hexamethylene diamine and equimolar adipic acid having a relative viscosity of 2.6 (95% surfuric acid at 25° C.), melting point at 260° C.
b) Polyamide II (C-PA II): Polyamide comprising hexamethylene diamine/equimolar adipic acid in 90 wt. % and ε-caprolactam in 10 wt. % having relative viscosity of 2.7 (95% surfuric acid at 25° C.), melting point at 240° C.

(2) Polyamide copolymer
a) Polyamide copolymer I (A-PA I): Polyamide copolymer comprising bis(4-aminocyclohexyl)propane in 40 mole %, hexamethylene diamine in 10 mole %, isophthalic acid in 15 mole %, terephthalic acid in 5 mole % and azelaic acid in 30 mole %. Melting viscosity (280° C., 5000 l/sec) was 5600 Poise, free transfer temperature at 180° C.
b) Polyamide copolymer II (A-PA II): Polyamide copolymer comprising bis(4-amino-3-methylcyclohexyl)methane in 40 mole %, adipic acid in 40 mole % and ω-laurolactam in 20 () mole %. Melting viscosity (280t, 5000 l/sec) was 7500 Poise, free transfer temperature at 146° C.
c) Polyamide copolymer III (A-PA III): Polyamide copolymer comprising a mixture of 2,2,4- and 2,4,4-trimethylene diamine (1:1) in 35 mole %, hexamethylene diamine in 15 mole % and terephthalic acid in 50 mole %. Melting viscosity (280° C., 5000 l/sec) was 6000 Poise, free transfer temperature at 155° C.

(3) Thermoplastic elastomer
a) Use of thermoplastic elastomer (TPE I): Two kinds of thermoplastic elastomer (Exler 1801, 1803; manufactured by Exxon Chemical in Belgium) comprising a graft of 1.0 wt % anhydrous maleic acid-ethylene on a propylene copolymer.
b) Use of thermoplastic elastomer (TPE II): "Craiton FG 1901 X" (manufactured by Shell Chemical in U.S.A.) comprising a graft of 2.0 wt % anhydrous maleic acid on a copolymer consisting of 72 wt. % of a copolymer of ethylene and 1-butene and 28 wt % of a block copolymer of polystyrene.

EXAMPLE 1–13

COMPARISON 14–22

In accordance with the blending ratios shown in the following Table 1, a polyamide, a polyamide copolymer, a thermoplastic elastomer and a fluoride polymer were dry-mixed by Hexel mixer and through their boundary mixture in a double-axle compressor (inside diameter=30 mm, L/D= 30), pellets were manufactured (melting point: 270°–300° C., screw RPM: 250 times/min, discharge rate: 25 kg/hour). The pellets so manufactured were dried in a nitrogen ceiling oven of 120° C. for more than 6 hours to give a water content of less than 0.1%.

The test specimens were manufactured by an injection method. The results are shown in the following Table.

TABLE 1

| Test | Crystalline polyamide Kind | wt % | Amorphous polyamide copolymer Kind | wt % | Thermoplastic elastomer Kind | wt % | Fluoride polymer Kind | wt % | Amide Modified wax Kind | wt % |
|---|---|---|---|---|---|---|---|---|---|---|
| EXAMPLE 1 | -C-PAI | 65 | A-PAI | 21 | TPEI | 10 | ETFE[1] | 3 | AMW[2] | 1 |
| EXAMPLE 2 | C-PAI | 65 | A-PAII | 21 | TPEI | 10 | ETFE | 3 | AMW | 1 |
| EXAMPLE 3 | C-PAI | 65 | A-PAIII | 21 | TPEI | 10 | ETFE | 3 | AMW | 1 |
| EXAMPLE 4 | C-PAI | 65 | A-PAI | 21 | TPEII | 10 | ETFE | 3 | AMW | 1 |
| EXAMPLE 5 | C-PAI | 65 | A-PAII | 21 | TPEII | 10 | ETFE | 3 | AMW | 1 |
| EXAMPLE 6 | C-PAI | 65 | A-PAIII | 21 | TPEII | 10 | ETFE | 3 | AMW | 1 |
| EXAMPLE 7 | C-PAII | 63 | A-PA I | 24 | TPEI | 9 | ETFE | 3 | AMW | 1 |
| EXAMPLE 8 | C-PAII | 63 | A-PAII | 24 | TPEI | 9 | ETFE | 3 | AMW | 1 |
| EXAMPLE 9 | C-PAII | 63 | A-PAIII | 24 | TPEI | 9 | ETFE | 3 | AMW | 1 |
| EXAMPLE 10 | C-PAII | 63 | A-PA I | 24 | TPEI | 9 | ETFE | 3 | AMW | 1 |
| EXAMPLE 11 | C-PAII | 63 | A-PAII | 24 | TPEI | 9 | ETFE | 3 | AMW | 1 |
| EXAMPLE 12 | C-PAII | 63 | A-PAIII | 24 | TPEII | 9 | ETFE | 3 | AMW | 1 |
| EXAMPLE 13 | C-PAI & C-PAII | 65 | A-PAI | 21 | TPEI | 10 | ETFE | 3 | AMW | 1 |
| EXAMPLE 14 | C-PAI | 86 | — | — | TPEI | 14 | — | — | — | — |
| EXAMPLE 15 | C-PAI | 64 | A-PAI | 20 | TPEI | 15 | ETFE | 1 | — | — |
| EXAMPLE 16 | C-PAI | 80 | A-PAI | 19 | — | — | — | — | AMW | 1 |
| EXAMPLE 17 | C-PAI | 85 | — | — | TPEI | 11 | ETFE | 3 | AMW | 1 |
| EXAMPLE 18 | — | — | A-PAI | 85 | TPEI | 11 | ETFE | 3 | AMW | 1 |
| EXAMPLE 19 | — | — | A-PAII | 85 | TPEI | 11 | ETFE | 3 | AMW | 1 |
| EXAMPLE 20 | — | — | A-PAIII | 85 | TPEI | 11 | ETFE | 3 | AMW | 1 |
| EXAMPLE 21 | — | — | A-PAI | 85 | TPEII | 11 | ETFE | 3 | AMW | 1 |
| EXAMPLE 22 | C-PAI | 65 | TALC | 21 | TPEI | 11 | ETFE | 3 | AMW | 1 |

Note:
[1]ETFE: "HALON ET101" (manufactured by Ausimont in U.S.A.) was used as a polymer consisting of ethylene and tetrafluoroethylene (TFE).
[2]AMW: The item of Ausimont in U.S.A. was used as amide modified wax.

TEST EXAMPLE

With reference to the thermoplastic resin composition manufactured from the above EXAMPLES and COMPARISONS, a specimen of 50×80 mm (thickness: 3 mm) in size was manufactured to measure a variety of physical properties including painting. The results are shown in Table 2.

TABLE 2

| Test | Painting[1] | Photo-resistance[2] | Water resistance after painting[3] | Surface polishing degree[4] |
|---|---|---|---|---|
| EXAMPLE 1 | good | good | good | 81 |
| EXAMPLE 2 | good | good | good | 81 |
| EXAMPLE 3 | good | good | good | 80 |
| EXAMPLE 4 | good | good | good | 81 |
| EXAMPLE 5 | good | good | good | 80 |
| EXAMPLE 6 | good | good | good | 80 |
| EXAMPLE 7 | good | good | good | 81 |
| EXAMPLE 8 | good | good | good | 82 |
| EXAMPLE 9 | good | good | good | 82 |
| EXAMPLE 10 | good | good | good | 81 |
| EXAMPLE 11 | good | good | good | 84 |
| EXAMPLE 12 | good | good | good | 83 |
| EXAMPLE 13 | good | good | good | 80 |
| COMPARISON 14 | good | good | fair | 70 |
| COMPARISON 15 | good | good | good | 75 |
| COMPARISON 16 | fair | fair | good | 71 |
| COMPARISON 17 | fair | good | good | 70 |
| COMPARISON 18 | good | fair | fair | 69 |
| COMPARISON 19 | good | fair | fair | 68 |
| COMPARISON 20 | good | fair | fair | 68 |
| COMPARISON 21 | good | fair | fair | 69 |
| COMPARISON 22 | fair | good | poor | 67 |

N.B.
[1]Painting
(a) Heat-resisting cycle: Five cycles were performed (one cycle: 80° C. × 3 hours → room temperature × 1 hour → −30° C. × 3 hours → room temperature × 1 hour → 50° C., 98% RH × 15 hours → room temperature × 1 hour) and the following defects in fragment were observed : discoloration of fragment, poor polishing, cracking, swelling, detachment, dissolution, hardness, poor adhesion, etc.).
(b) Alkali-resistance: Drop 0.1N of NaOH to 0.2 ml of specimen, left it for 24 hours (temperature: 20 ± 2° C., humidity: 0.5 ± 5%). After picking up, washed it with water and air-blowed. After being left at room temperature for one hour, the defect in the appearance of fragment was detected.
(c) Wax-resistance remover: Test on about 1/2 of specimen was conducted based upon the following conditions and after picking it up immediately, the defect in the appearance of fragment was detected.

| Temperature | Time | Remarks |
|---|---|---|
| 20 ± 2° C. | 30 minutes | dipping |

(d) Contamination of fragment: Cut about 25 g urethane, sheet material, into small pieces of ICM in size, put them into wide-entrance 3 l bottle with a cap and then, place the specimen of 40 × 50 mm in size on one side of fragment so as not to contact with the urethane material. After closing the cap, left it at 80° C. for 22 hours. After picking it up, the appearance of fragment was observed. While dipping the fragment in water, scrubbed ten times (shuttle) the side of fragment with a force of about 500 g to observe the defects in fragment.
[2]Photo-resistance (or atmosphere corrosion resistance): Disclosed the fragment at carbon arc 63 ± 3° C. chamber for 48 minutes by a corrosion resistance-accelerating testing machine (manufactured by Atlas in U.S.A) and for 12 minutes, 1200 hours elapsed to observe discoloration, surface crack and transformation.
[3]Water resistance after painting: After dipping a fragment in water at 40° C. for 240 hours (or 500 hours), picked it up and wiped its moisture to observe the 1st fragment. Then, cut the lines (1 mm × 1 mm, 100 pieces) on the fragment and completely attached vinyl tape to the fragment. After detaching the vinyl tape, any detachment was observed.
[4]Surface polishing: Measured by Gross Meter at 60° (Test Angle).

What is claimed is:

1. A thermoplastic resin composition having good painting and surface polishing properties, comprising, in proportion to the total composition, 55–90 wt % of a polyamide homopolymer of hexamethylene diamine and equimolar adipic acid, 5–30 wt % of a polyamide copolymer of bis(4-aminocyclohexyl) propane. hexamethylene diamine, isophthalic acid, terephthalic acid and azelaic acid, 3–30 wt % of a thermoplastic elastomer comprising a graft of anhydrous maleic acid-ethylene on a propylene copolymer, 1–5 wt % of a fluoride polymer comprising a copolymer of ethylene and tetrafluoroethylene, and 0.2–2.5 wt % of an amide wax.

2. A thermoplastic resin composition according to claim 1, wherein the polyamide homopolymer comprises hexamethylene diamine and equimolar adipic acid having a relative viscosity of 2.6 and a melting point of 260° C.

3. A thermoplastic resin composition according to claim 1, wherein the bis(4-aminocyclohexyl) propane is present in an amount of 40 mole %, the hexamethylene diamine is present in an amount of 10 mole %, the isophthalic acid is present in an amount of 15 mole %, the terephthalic acid is present in an amount of 5 mole %, and the azelaic acid is present in an amount of 30 mole %.

4. A thermoplastic resin composition according to claim 1, wherein the thermoplastic elastomer is a graft of 1 wt % anhydrous maleic acid-ethylene on a propylene copolymer.

5. A thermoplastic resin composition according to claim 2, wherein the bis(4-aminocyclohexyl) propane is present in an amount of 40 mole %, the hexamethylene diamine is present in an amount of 10 mole %, the isophthalic acid is present in an amount of 15 mole %, the terephthalic acid is present in an amount of 5 mole %, and the azelaic acid is present in an amount of 30 mole %, and the thermoplastic elastomer is a graft of 1 wt % anhydrous maleic acid-ethylene on a propylene copolymer.

6. A thermoplastic resin composition according to claim 5, wherein the polyamide homopolymer is present in an amount of 65 wt %, the polyamide copolymer is present in an amount of 21 wt %, the thermoplastic elastomer is present in an amount of 10 wt %, the fluorine polymer is present in an amount of 3 wt %, and the amide wax is present in an amount of 1 wt %.

7. A thermoplastic resin composition according to claim 1, wherein the polyamide homopolymer is present in an amount of 65 wt %, the polyamide copolymer is present in an amount of 21 wt %, the thermoplastic elastomer is present in an amount of 10 wt %, the fluorine polymer is present in an amount of 3 wt %, and the amide wax is present in an amount of 1 wt %.

* * * * *